United States Patent
Endo et al.

(10) Patent No.: US 12,410,492 B2
(45) Date of Patent: Sep. 9, 2025

(54) RESISTANCE SPOT WELD, RESISTANCE SPOT WELDING METHOD, RESISTANCE SPOT WELDED JOINT, AND METHOD FOR MANUFACTURING RESISTANCE SPOT WELDED JOINT

(71) Applicant: JFE STEEL CORPORATION, Tokyo (JP)

(72) Inventors: Reiko Endo, Tokyo (JP); Muneo Matsushita, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 810 days.

(21) Appl. No.: 17/614,424

(22) PCT Filed: Mar. 4, 2020

(86) PCT No.: PCT/JP2020/009011
§ 371 (c)(1),
(2) Date: Nov. 26, 2021

(87) PCT Pub. No.: WO2020/240961
PCT Pub. Date: Dec. 3, 2020

(65) Prior Publication Data
US 2022/0228233 A1    Jul. 21, 2022

(30) Foreign Application Priority Data

May 28, 2019 (JP) .................................. 2019-099371
Nov. 8, 2019 (JP) .................................. 2019-203134

(51) Int. Cl.
*C22C 38/00* (2006.01)
*B23K 11/11* (2006.01)
(Continued)

(52) U.S. Cl.
CPC ............ *C21D 9/505* (2013.01); *B23K 11/115* (2013.01); *B23K 11/24* (2013.01); *C21D 6/005* (2013.01);
(Continued)

(58) Field of Classification Search
CPC ....... C22C 38/002; C22C 38/02; C22C 38/04; B23K 2103/04; C21D 2211/008
(Continued)

(56) References Cited

U.S. PATENT DOCUMENTS

2012/0141829 A1   6/2012   Oikawa et al.
2015/0217396 A1   8/2015   Okada et al.
(Continued)

FOREIGN PATENT DOCUMENTS

EP   2 460 613 A1   6/2012
EP   2 987 581 A1   2/2016
(Continued)

OTHER PUBLICATIONS

Aug. 13, 2020 Office Action issued in Japanese Patent Application No. 2020-526161.
(Continued)

*Primary Examiner* — Katherine A Christy
(74) *Attorney, Agent, or Firm* — Oliff PLC

(57) ABSTRACT

A resistance spot weld, a resistance spot welding method, a resistance spot welded joint, and a method for manufacturing the resistance spot welded joint. In the resistance spot weld, at least one of steel sheets is a high-strength steel sheet having a prescribed chemical composition. In at least one of a nugget edge region corresponding to a faying interface, the nugget edge region has a metal microstructure including tempered martensite as a main phase. The hardness Hv of the nugget edge region and the hardness Hmw of martensite in
(Continued)

the nugget as a whole satisfy formula (4). In at least one of a strong HAZ region corresponding to the faying interface, the hardness Hh of the strong HAZ region and the hardness Hmh of martensite in a prescribed steel sheet satisfy formula (8).

$$Hv \leq Hmw - 40 \quad (4)$$

$$Hh < Hmh - 25 \quad (8)$$

20 Claims, 4 Drawing Sheets

(51) Int. Cl.
  *B23K 11/24* (2006.01)
  *C21D 6/00* (2006.01)
  *C21D 9/50* (2006.01)
  *C22C 38/02* (2006.01)
  *C22C 38/04* (2006.01)
  *B23K 103/04* (2006.01)

(52) U.S. Cl.
  CPC ............ *C21D 6/008* (2013.01); *C22C 38/002* (2013.01); *C22C 38/02* (2013.01); *C22C 38/04* (2013.01); *B23K 2103/04* (2018.08); *C21D 2211/008* (2013.01)

(58) Field of Classification Search
  USPC ........................................................ 428/594
  See application file for complete search history.

(56) References Cited

U.S. PATENT DOCUMENTS

| | | | |
|---|---|---|---|
| 2016/0067814 A1* | 3/2016 | Furusako | B23K 11/3054 219/86.7 |
| 2016/0076117 A1 | 3/2016 | Terajima et al. | |

FOREIGN PATENT DOCUMENTS

| | | |
|---|---|---|
| EP | 3 015 215 A1 | 5/2016 |
| JP | 2010-172946 A | 8/2010 |
| JP | 5182855 B2 | 4/2013 |
| JP | 2013-78782 A | 5/2013 |
| JP | 2013-103273 A | 5/2013 |
| JP | 2013-128945 A | 7/2013 |
| JP | 2016-55337 A | 4/2016 |
| WO | 2011/013793 A1 | 2/2011 |
| WO | 2011/025015 A1 | 3/2011 |
| WO | 2014/171495 A1 | 10/2014 |
| WO | 2014/208747 A1 | 12/2014 |

OTHER PUBLICATIONS

Jul. 4, 2022 Extended European Search Report issued in European Patent Application No. 20812882.7.
Jul. 5, 2024 Office Action issued in European Patent Application No. 20 812 882.7.
Apr. 14, 2020 International Search Report issued in International Application No. PCT/JP2020/009011.
Jun. 18, 2025 Office Action issued in European Patent Application No. 20812882.7.

* cited by examiner (A)

(B)

RESISTANCE SPOT WELD, RESISTANCE SPOT WELDING METHOD, RESISTANCE SPOT WELDED JOINT, AND METHOD FOR MANUFACTURING RESISTANCE SPOT WELDED JOINT

TECHNICAL FIELD

The present application relates to a resistance spot weld, to a resistance spot welding method, to a resistance spot welded joint, and to a method for manufacturing the resistance spot welded joint.

BACKGROUND

In recent years, various high-strength steel sheets (high-tensile steel sheets) are being increasingly used for automobile bodies from the viewpoint of achieving weight reduction to thereby improve fuel efficiency and from the viewpoint of crash safety. In automobile assembly lines, resistance spot welding is mainly used to join components such as structural members of automobiles including high-strength steel sheets. Welded joints joined by resistance spot welding are required to have strength (tensile strength) enough to withstand fracture even when deformed during a crash in order to obtain crash safety as described above. The joint strength of a resistance spot weld in a welded joint is evaluated by tensile shear strength (TSS) that is the tensile strength of the joint in the shear direction and cross tension strength (CTS) that is the tensile strength of the joint in the peeling direction.

The TSS of a resistance spot weld tends to increase along with the tensile strength of the base material. However, it is known that the CTS of the resistance spot weld decreases in some cases when the tensile strength of the base material is 780 MPa or more. As the CTS decreases, the mode of failure changes from plug failure in which ductile fracture occurs in the HAZ (heat-affected zone) or the base material around the resistance spot weld to interface failure or partial plug failure in which brittle fracture occurs in the nugget. It has generally been thought that one possible reason for the reduction in the CTS is that brittle fracture occurs due to hardening of an edge portion of the nugget by quenching.

To prevent the brittle fracture, various studies have been conducted on a secondary energization method in which energization is again performed after primary energization. Examples of the secondary energization method in which energization is again performed after the primary energization include techniques described in Patent Literature 1 to Patent Literature 4.

Patent Literature 1 describes that a nugget (melt-solidified portion) and a heat-affected zone in a base material of a specific steel type have a tempered martensite microstructure or a tempered bainite microstructure.

Patent Literature 2 specifies the maximum temperature of the boundary between a nugget and a corona bond after a secondary energization step.

Patent Literature 3 specifies the hardness of a portion outside a nugget and the microstructure inside the nugget.

Patent Literature 4 describes that tempering is performed using a high current value.

CITATION LIST

Patent Literature

PTL 1: Japanese Patent No. 5182855
PTL 2: Japanese Unexamined Patent Application Publication No. 2013-103273
PTL 3: Japanese Unexamined Patent Application Publication No. 2013-78782
PTL 4: Japanese Unexamined Patent application Publication No. 2010-172946

SUMMARY

Technical Problem

However, in Patent Literature 1, only the chemical composition of the base material is specified, and no consideration is given to welding conditions that allow the nugget and the heat-affected zone to have the above-described microstructure, specifically the temperature range in the secondary energization.

In Patent Literature 2, the secondary energization in which the temperature is increased in a short time is performed to allow the degree of segregation to be reduced, so that the strength of: the joint is improved. However, in Patent Literature 2, since the degree of segregation is reduced by energization in a short time in order to improve the joint strength, the temperature of the edge portion of the nugget is not reduced to a temperature lower than the Ms temperature during the set cooling time. Therefore, the microstructure after the primary energization is limited to a microstructure that does not undergo martensitic transformation in a subsequent cooling process, so that tempered marten site cannot be obtained. Thus, the toughness of the edge portion of the nugget is not improved.

Patent Literature 3 is based on conditions that the microstructure of the nugget is an equiaxed martensite microstructure and a soft region having a lower hardness than the base material is present outside the nugget, in order to achieve both the TSS and the CTS simultaneously. In the secondary energization, a high current about two times larger than that in the primary energization step is applied in a short time (0.1 seconds or shorter). However, since the microstructure of the nugget obtained is a martensite microstructure, sufficient toughness is not obtained. Specifically, in Patent Literature 3, no consideration is given to tempering at high temperature for appropriate control of hardness.

In Patent Literature 4, since tempering is performed using a current value higher than that in the primary energization, it is feared that the temperature of the edge portion of the nugget may exceed the melting point and the edge portion may melt. When the edge portion of the nugget melts, martensite is formed in the edge portion during cooling, so that sufficient strength cannot be obtained.

Another method for preventing the brittle fracture is a resistance spot welding method that uses only single energization. However, when this resistance spot welding method that uses only single energization is used for a high-strength steel sheet having a tensile strength of 780 MPa or more and having a chemical composition including Mn in an amount of 1.5 to 10.0% by mass (this steel sheet is hereinafter referred to as a medium Mn steel sheet), an austenite microstructure contained in the medium Mn steel sheet is transformed to a martensite microstructure when the molten fusion zone formed by the energization is solidified.

Therefore, the resulting microstructure is hard and brittle, and the CTS is disadvantageously low.

The disclosed embodiments have been made in view of the foregoing problems, and it is an object to provide a resistance spot weld in which the toughness of an edge portion of the nugget of the resistance spot weld is improved to thereby improve the joint strength even when the above-described high-strength steel sheet having a tensile strength of 780 MPa or more, particularly a medium Mn steel sheet, is used. It is another object to provide a resistance spot welding method, a resistance spot welded joint, and a method for manufacturing the resistance spot welded joint.

Solution to Problem

In the disclosed embodiments, to solve the foregoing problems, extensive studies have been conducted on the mechanism of the reduction in the CTS in resistance spot welding of a sheet set including high-strength steel sheets having a tensile strength of 780 MPa or more and on a method for improving the CTS.

As described above, as the strength of steel sheets increases, their CTS decreases. As the CTS decreases, the mode of failure changes from plug failure in which ductile fracture occurs in the HAZ or the base material around the resistance spot weld to interface failure or partial plug failure in which brittle fracture occurs in the nugget. Therefore, with high-strength steel sheets, it is difficult to obtain sufficient CTS. The cause of the interface failure is embrittlement of the edge portion of the nugget due to a hard microstructure formed by rapid cooling after the formation of the nugget. In this case, cracking occurs in the edge portion of the nugget, causing the interface failure. Therefore, to prevent the brittle fracture, it is necessary to form a microstructure in which the edge portion of the nugget has toughness.

Accordingly, in the disclosed embodiments, further studies have been conducted on a method for improving the toughness of the edge portion of the nugget in order to improve the CTS of the resistance spot weld in the high-strength steel sheets. Then the present inventors have found that, in the range in which brittle fracture occurs, the fracture surface changes from a ductile fracture surface to a brittle fracture surface as the degree of tempering increases and that this causes embrittlement. Specifically, it has been found that the toughness of the edge portion of the nugget can be improved by performing tempering at a temperature higher or lower than the temper embrittlement temperature range.

Specifically, primary energization in which heating to a temperature range equal to or higher than the melting point is performed to form a nugget. Then, a cooling process is performed in which the fusion zone is solidified and rapid cooling to a temperature at which the austenite microstructure is transformed to the martensite microstructure is performed. Then secondary energization is performed in which the edge portion of the nugget is tempered in an appropriate temperature range. Through this energization step, the metal microstructure of the edge portion of the nugget is transformed to a microstructure including a tempered marten site microstructure serving as a main phase. In this case, when the hardness Hv of a specific region of the edge portion of the nugget (a nugget edge region described later) and the hardness Hmw of the martensite microstructure in the nugget as a whole satisfy a prescribed relational expression, the edge portion of the nugget has a tempered martensite microstructure having high toughness. It has therefore been found that the effect or avoiding the interface failure of the resistance spot weld can be obtained. It has also been found that, when the CTS of a resistance spot weld subjected to the tempering described above is high, the hardness Hh of a specific region of the HAZ (a strong HAZ region described later) and the hardness Hmh of the martensite microstructure in the overlapping steel sheets satisfy a prescribed relational expression.

The disclosed embodiments are based on the above findings and summarized as follows.

[1] A resistance spot weld in a welded member prepared by resistance spot-welding at least two overlapping steel sheets, wherein at least one of the steel sheets is a high-strength steel sheet having a chemical composition satisfying the following ranges, in mass %, C: 0.05 to 0.6%, Si: 0.1 to 3.5%, Mn: 1.5 to 10.0%, and P: 0.1% or less, wherein two points on a boundary of a nugget at intersections of the boundary of the nugget with a faying interface between the steel sheets are defined as a first edge and a second edge, wherein the length of a line segment X connecting the first edge and the second edge is defined as D (mm), wherein a position on the line segment X that is spaced from the first edge toward a center of the nugget is defined as a point O, and a position on the line segment X that is spaced from the second edge toward the center of the nugget is defined as a point P, wherein a region which is located inside the nugget and in which the distance L (mm) from the first edge to the point O and the distance L (mm) from the second edge to the point P satisfy formula (1) below is defined as a nugget edge region, wherein, in at least one of the nugget edge region corresponding to the faying interface, the nugget edge region has a metal microstructure including tempered martensite as a main phase, wherein the hardness Hv of the nugget edge region and the hardness Hmw of martensite in the nugget as a whole satisfy formula (4) below, the hardness Hmw being computed using formulas (2) and (3) below, wherein, in the steel sheet on an upper side of the faying interface and/or the steel sheet on a lower side of the faying interface, intersections of a straight line Z parallel to the faying interface with the boundary of the nugget are defined as points q, and positions on the straight line Z in a heat-affected zone are defined as points r, wherein a region which is located inside the heat-affected zone, in which the distance M (mm) between the straight line Z and the faying interface in a sheet thickness direction satisfies formula (5) below, and in which the distance T (mm) from each of the points q to a corresponding one of the points r satisfies formula (6) below is defined as a strong HAZ region, wherein, in at least one of the strong HAZ region corresponding to the faying interface, the hardness Uh of the strong HAZ region and the hardness Hmh of martensite in the steel sheets satisfy formula (8) below, the hardness Hmh being computed using formula (7) below.

[Math. 1]

$$0 < L \leq 0.25 \times D \quad (1)$$

$$Hmw = 884 \times Cw \times (1 - 0.3 \times Cw^2) + 294 \quad (2)$$

$$Cw(\% \text{ by mass}) = \frac{\sum_{i=n}^{} C_i V_i}{\sum_{i=n}^{} V_i} \quad (3)$$

$$Hv \leq Hmw - 40 \quad (4)$$

In formulas (2) to (3),
Cw (% by mass): the content of C per unit volume in the nugget in the steel sheets,
$C_i$ (% by mass): the content of C in each of the overlapping steel sheets,
$V_i$ (mm$^2$): a molten area of each of the steel sheets in a region surrounded by the boundary of the nugget and the line segment X in a cross section taken in the sheet thickness direction and passing through the center of the nugget,
n: the number of overlapping steel sheets.

$$M = D/20 \quad (5)$$

$$0 < T \leq D/10 \quad (6)$$

$$Hmh = 884 \times Ch \times (1 - 0.3 \times Ch^2) + 294 \quad (7)$$

$$Hh < Hmh - 25 \quad (8)$$

In formula (7), Ch (% by mass): the content of C in the steel sheet on the upper side of the fraying interface or the content of C in the steel sheet on the lower side of the faying interface.

When a gap is present at the laying interface between the steel sheets, two points on the boundary of the nugget at intersections of the boundary of the nugget with a straight line Y positioned at a midpoint of the gap and parallel to surfaces of the steel sheets are used as the first edge and the second edge.

[2] The resistance spot weld according to [1], wherein the area fraction of carbides in the tempered martensite is more than 20%.

[3] The resistance spot weld according to [2], wherein the average gran size of the carbides is 300 nm or less.

[4] The resistance spot weld according to any one of [1] to [3], wherein the high-strength steel sheet has a tensile strength of 780 MPa or more.

[5] A resistance spot welding method for producing the resistance spot weld according to any one of [1] to [4], the method including:
performing energization at a current value $I_w$ (kA) as a primary energization step to form a weld;
then performing cooling for a cooling time $t_c$ (ms) represented by formula (13) below; and
then performing energization at a current value $I_t$ (kA) represented by formula (14) below for an energization time $t_p$ (ms) represented by formula (15) below as a tempering step.

$$400 \leq t_c \quad (13)$$

$$I_t \leq 00.95 \times I_w \quad (14)$$

$$400 \leq t_p \quad (15)$$

[6] A resistance spot welded joint including the resistance spot weld according to any one of [1] to [4].

[7] A resistance spot welded joint manufacturing method for manufacturing a resistance spot welded joint using the resistance spot welding method according to [5].

Advantageous Effects

In the disclosed embodiments, the metal microstructure and the hardness of an edge portion of a nugget of a resistance spot weld in high-strength steel sheets and the hardness of the HAZ around the edge portion of the nugget are specified. This allows the toughness of the resistance spot weld to be improved and the joint strength to be improved.

DESCRIPTION OF EMBODIMENTS

The disclosed embodiments will be described with reference to the drawings. However, the present application is not limited to the following embodiments.

The resistance spot weld of the disclosed embodiments will be described using FIGS. 1(A) to 3(B).

Figure 1:
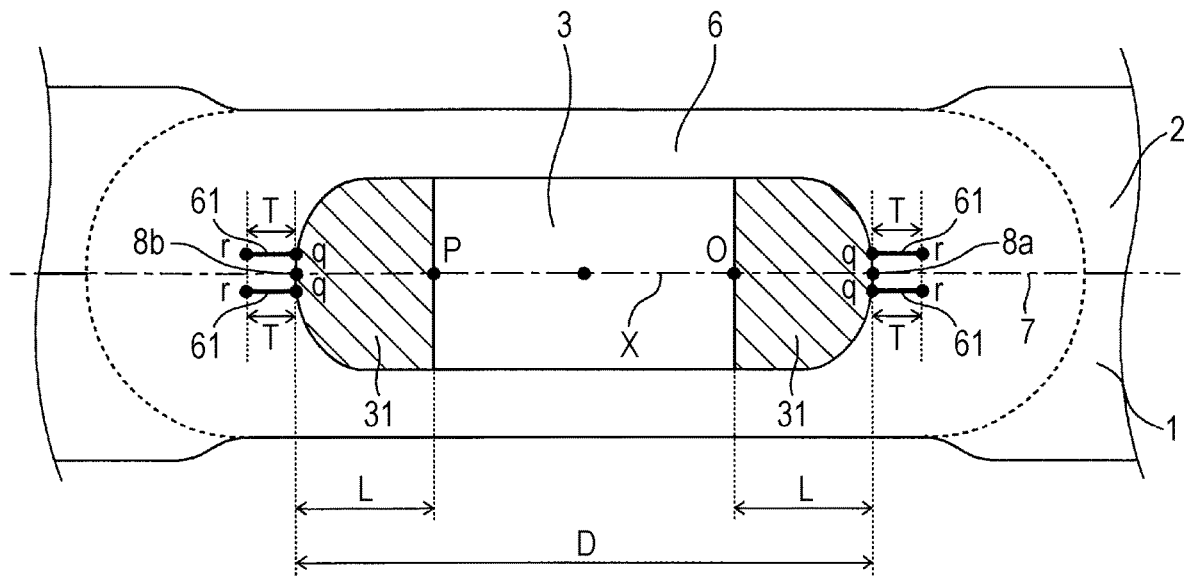
FIGS. 1(A) and 1(B) are cross-sectional views illustrating a resistance spot weld in one embodiment of the disclosed embodiments.
Figure 1:
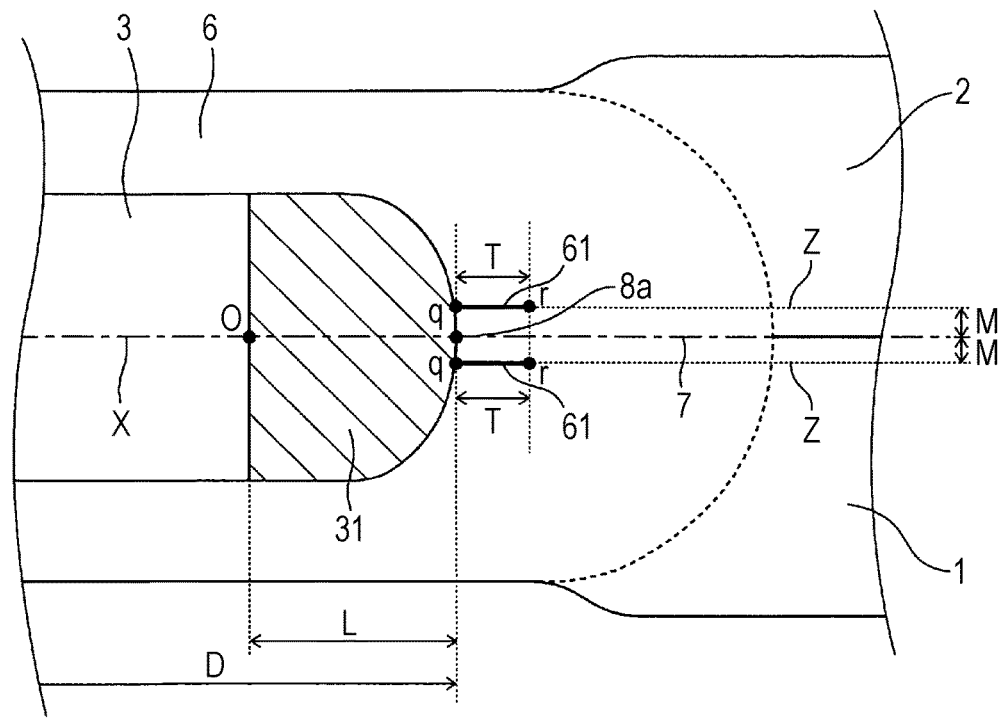
Figure 2:
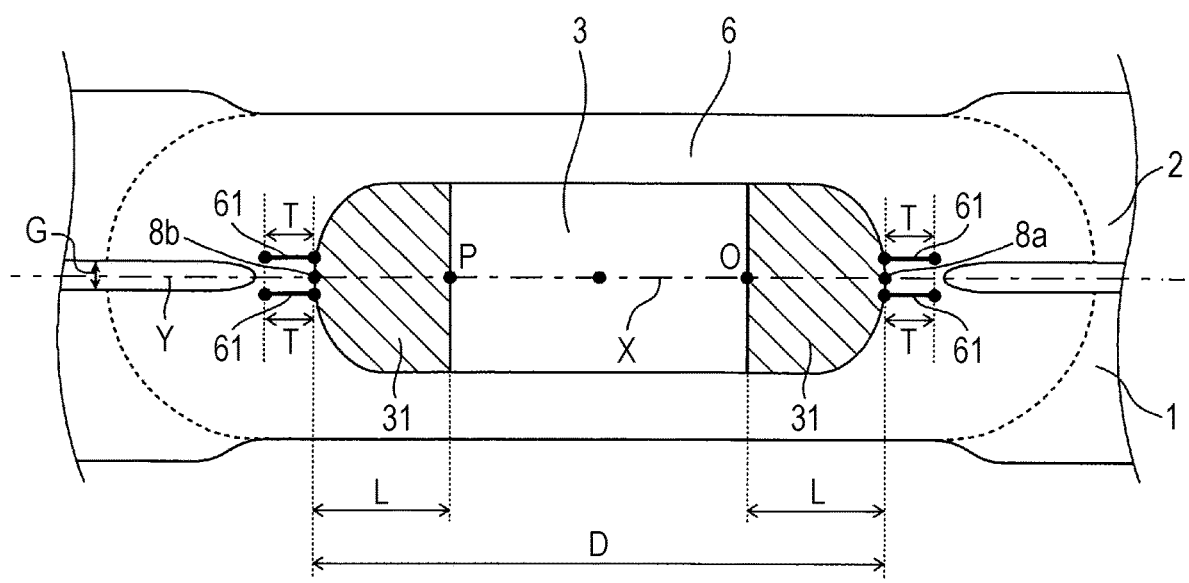
FIG. 2 is a cross-sectional view illustrating the case in which the resistance spot weld shown in FIG. 1(A) has a sheet gap.
Figure 3:
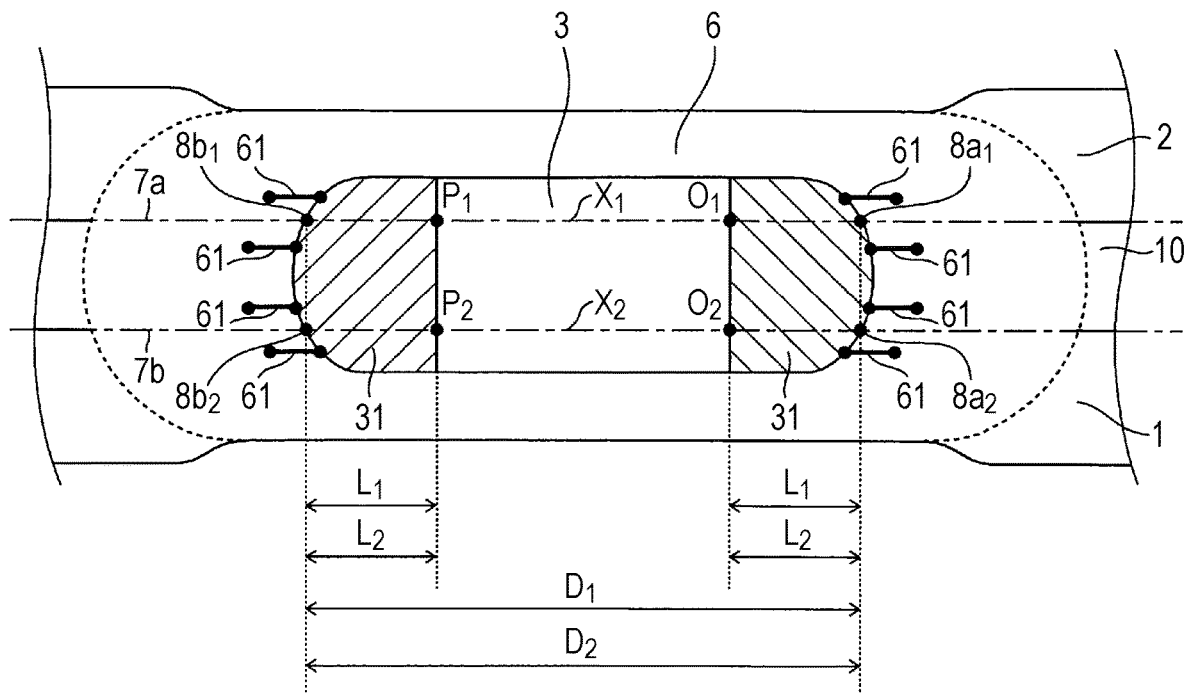
FIGS. 3(A) and 3(B) are cross-sectional views illustrating a resistance spot weld in another embodiment of the disclosed embodiments.
Figure 3:
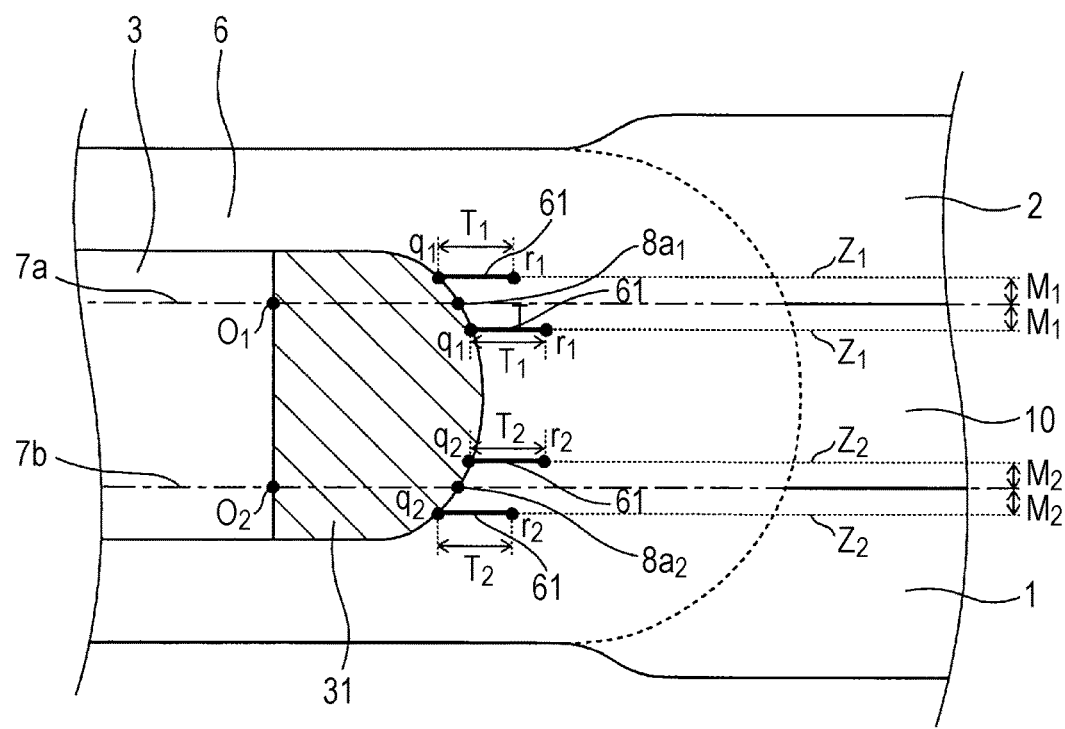

FIGS. 1(A) to 3(B) are cross-sectional views illustrating examples of resistance spot welds obtained in the disclosed embodiments, the cross-sectional views being taken in a sheet thickness direction. FIG. 1(A) shows a general view of a resistance spot weld obtained by welding two overlapping steel sheets together, and FIG. 1(B) is a partial enlarged view of the resistance spot weld shown in FIG. 1(A). FIG. 2 shows an example in which a sheet gap is present at the faying interface between the steel sheets in the resistance spot weld shown in FIG. 1(A). FIG. 3(A) shows a general view of a resistance spot weld obtained by welding three overlapping steel sheets, and FIG. 3(B) is a partial enlarged view of the resistance spot weld shown in FIG. 3(A).

The disclosed embodiments relate to a resistance spot weld in a welded member obtained by joining two or more overlapping steel sheets together by resistance spot welding. The overlapping steel sheets include at least one high-strength steel sheet described later. In the example shown in FIGS. 1(A) and 1(B) the steel sheet 1 disposed on the lower side and the steel sheet 2 disposed on the upper side are stacked together. The lower steel sheet 1 and/or the upper steel sheet 2 is a high-strength steel sheet.

As shown in FIGS. 1(A) to 3(B), the resistance spot weld of the disclosed embodiments (hereinafter referred to as a weld) includes a nugget 3 and a heat-affected zone (HAZ) 6. In a plan view of the upper steel sheet 2 when it is viewed from the front surface side of the steel sheet, the nugget 3 in the weld is formed into a circular shape although the view is not illustrated, and a cross section of the nugget 3 that is taken in the sheet thickness direction and passes through the center of the nugget 3 has an elliptical shape.

First, a weld in a sheet set including two steel sheets will be described using FIGS. 1(A), 1(B), and 2. As shown in these figures, the weld includes edge regions 31 located in the nugget 3 and having a metal microstructure with high toughness and strong HAZ regions 61 located in the HAZ 6 and having a prescribed hardness.

In the example shown in FIGS. 1(A) and 1(B), two points on the boundary of the elliptical nugget 3 at intersections of the boundary with a faying interface 7 between the overlapping steel sheets 1 and 2 are defined as a first edge 8a and a second edge 8b. A straight line connecting the first edge 8a to the second edge 8b is referred to as a line segment X, and the length of the line segment X is defined as D (mm). A position on the line segment X that is spaced from the first edge 8a toward the center of the nugget 3 is defined as a point O, and the distance from the first edge 8a to the point O is defined as L (mm). A position on the line segment X that is spaced from the second edge 8b toward the center of the nugget 3 is defined as a point P, and the distance from the second edge 8b to the point P is defined as L (mm). A region which is inside the nugget 3 and in which these distances L satisfy formula (1) below is defined as nugget edge regions 31 (hereinafter may be referred to as an "edge region"). As shown in FIG. 1(A), the edge region 31 appears at both ends of the nugget 3.

Edge regions 31 can be defined for respective faying interfaces 7 between the steel sheets. Specifically, when three or more steel sheets are stacked and resistance spot-welded together to form a welded member, the welded member has at least two faying interfaces, and a nugget edge region can be defined for each faying interface. For example, when three steel sheets are used to form a sheet set shown in FIG. 3(A) described the number of fayinq interfaces is two, and a nugget edge region is present for each faying interface.

$$0 < L \leq 0.25 \times D \tag{1}$$

As described above, in the edge region 31, the distance L from the first edge 8a to the point O and the distance L from the second edge 8b to the point P satisfy formula (1). When the distances L do not satisfy the condition of formula (1) (i.e., $0 < L \leq 0.25 \times D$), the region at the edge of the nugget that has an influence on the joint strength does not have the metal microstructure of the disclosed embodiments described later. From the viewpoint of further improving the joint strength, it is preferable that the distances L satisfy $0 < L \leq 0.20 \times D$.

In the disclosed embodiments, the metal microstructure of the central portion of the nugget (a region of the nugget 3 other than the edge region 31 in the example shown in FIG. 1(A)) has no influence on the joint strength and is therefore not particularly specified.

The metal microstructure of the edge region 31 at both ends of the nugget includes a tempered martensite microstructure as a main phase. In the disclosed embodiments, the main phase means that the area fraction of the tempered martensite microstructure with respect to the entire metal microstructure in the nugget 3 is 60% or more.

If the area fraction of the tempered martensite microstructure is less than 60%, the degree of tempering may be insufficient, or the metal microstructure obtained may include a large amount of a martensite microstructure formed because of excessively high tempering temperature. If the amount of the martensite microstructure in a remainder microstructure described later is large, the microstructure of the edge portion of the nugget is hard and brittle, and brittle fracture may occur, so that the joint strength is low. Therefore, the area fraction of the tempered martensite microstructure is 60% or more. The area fraction of the tempered martensite microstructure is preferably 80% or more and more preferably 90% or more. In the disclosed embodiments, it is preferable that the edge portion of the nugget contains a large amount of the tempered martensite microstructure having toughness, so that the upper limit of the tempered martensite microstructure is not particularly specified. The area fraction of the tempered martensite microstructure is preferably 100% or less.

The metal microstructure of the edge region 31 may include a martensite microstructure as a microstructure other than the tempered martensite microstructure (such a microstructure may be hereinafter referred to as a "remainder microstructure"). For example, this microstructure is a martensite microstructure that can be present when the cooling time has been too short to temper the martensite microstructure (i.e., the degree of tempering is insufficient) or when the tempering temperature has been too high and martensitic transformation has occurred again (i.e., the tempering temperature has been excessively high). The martensite microstructure is a particularly brittle microstructure, and it is therefore feared that the martensite microstructure may have a large influence on the reduction in the joint strength. It is therefore preferable that the area fraction of the martensite microstructure is reduced as much as possible and is preferably less than 40%.

Carbides precipitate in the tempered martensite microstructure. It has been found that, when the tempering is performed such that the hardness Hv of the edge region 31 satisfies the intended hardness of the disclosed embodiments, the area fraction of the carbide particles in the tempered martensite microstructure is more than 20%. As the degree of tempering increases, the carbide particles coarsen, and the spacings between adjacent carbide particles decrease. Moreover, as the degree of tempering increases, the amount of the carbide particles increases. Therefore, when the area fraction of the carbide particles in the tempered martensite microstructure is more than 20% and the target hardness described above is obtained, it can be judged that the temperature has been prevented from falling within the temper embrittlement range in a more appropriate manner. Specifically, it can be judged that a more appropriate tempering temperature has been used. Therefore, the area fraction of the carbide particles in the tempered martensite microstructure is preferably more than 20%, more preferably 23% or more, and still more preferably 40% or more and is preferably 85% or less, more preferably 75% or less, and still more preferably 50% or less.

The carbide particles are formed because precipitation of supersaturated C occurs during tempering. Therefore, the fraction of the carbide particles indicates the degree of tempering.

The fraction of the carbide particles specified is the fraction of carbide particles having an average grain size (which may be hereinafter referred to as an average grain diameter) of 300 nm or less. This is because, if the average grain size of the carbide particles exceeds 300 nm, the tempering temperature may have been increased to the embrittlement temperature range because the grains are large. In the disclosed embodiments, the microstructure of the nugget edge region and the carbide particles in the tempered martensite microstructure can be measured using methods described later in Examples.

In the disclosed embodiments, the hardness Hv of the edge region 31 and the hardness How of the martensite microstructure in the nugget 3 as a whole that is computed from formulas (2) and (3) below satisfy formula (4) below.

[Math. 2]

$$Hmw = 884 \times Cw \times (1 - 0.3 \times Cw^2) + 294 \quad (2)$$

$$Cw(\% \text{ by mass}) = \frac{\sum_{i=n}^{i=n} C_i V_i}{\sum_{i=n}^{i=n} V_i} \quad (3)$$

$$Hv \leq Hmw - 40 \quad (4)$$

In formulas (2) to (3),

Cw (% by mass): the content of C per unit volume in the nugget in the steel sheets, Ci (% by mass): the content of C in one of the overlapping steel sheets, Vi (mm$^2$): the molten area of one or the steel sheets in a region surrounded by the boundary of the nugget and the line segment X in a cross section taken in the sheet thickness direction and passing through the center of the nugget, and n: the number of overlapping steel sheets.

It has been found in the disclosed embodiments that, when the hardness by of the edge region 31 is in the embrittlement range, the degree of tempering is high and the fracture surface changes from a ductile fracture surface to a brittle fracture surface, so that the edge region 31 is brittle. Specifically, when the degree of tempering is excessively high and the edge region 31 is brittle, it is feared that the hardness of the edge portion of the nugget may be lower than that when tempering is performed appropriately.

Accordingly, the present inventors observed a fracture surface of a joint portion subjected to the embrittle range under an SEM. Then the inventors found that the area of an intergranular fracture surface in a nugget as a whole was large and the area of the intergranular fracture surface in the nugget edge portion was also large, so that the fracture surface was a brittle fracture surface. However, when tempering was performed at high temperature, a ductile fracture surface including dimples was found around the edge portion of the nugget. Therefore, it was found that, in the joint portion subjected to the embrittlement range, the fracture surface included many grain boundaries. Specifically, in the embrittlement range, since P segregates to the grain boundaries, the mode of fracture is brittle it was therefore found that this caused a reduction in the joint strength. Therefore, in the disclosed embodiments, the tempering state is judged using both the metal microstructure and hardness of the edge portion of the nugget.

As described above, when the hardness Hv of the edge region 31 satisfies the relational expression Hv≤Hmw−40 (formula (4)), the edge portion of the nugget 3 has been tempered in the temperature range lower or higher than the embrittlement range and equal to or lower than the melting point, and this indicates that a good joint is obtained. Moreover, the smaller the value of the hardness Hv of the edge region 31, the higher the degree of tempering. As the degree of tempering increases, the toughness of the edge portion of the nugget is improved, and cracks propagate toward the outside of the nugget. In this case, the cracks do not propagate toward the inside of the nugget, so that plug failure occurs. This may improve the joint strength. In consideration of tempering that allows a better joint to be obtained, the hardness Hv of the edge region 31 is preferably (Hmw−55) or less.

The lower limit of the hardness Hv of the edge region 31 is not particularly specified. There is a limit on the reduction in the hardness of the edge region 31 by tempering. Therefore, to obtain the metal microstructure in the disclosed embodiments appropriately, the hardness Hv of the edge region 31 is preferably (Hmv−700) or more.

When the secondary energization temperature is appropriate, the temperature of part of the edge portion of the nugget composed of tempered martensite as a main phase may be increased to the austenite range. In this case, the microstructure that has undergone reverse transformation may become the martensite microstructure after completion of the secondary energization.

In the disclosed embodiments, the nugget has the edge portion structure described above, and the HAZ 6 has a structure described below. Specifically, the hardness Hh of a specific region in the HAZ 6 (a strong HAZ region 61 described later) and the hardness Hmh of the martensite microstructure in the steel sheets satisfy a relational expression (formula (8)) below. In this case, it can be checked that, even in a region inside the HAS, that may have an influence on the joint strength, the degree of tempering is not excessively high, and the effects of the disclosed embodiments can be obtained appropriately.

The structure of the HAS 6 in the disclosed embodiments will next be described. In the example shown in FIGS. 1(A) and 1(B), the strong HAZ region 61 in the steel sheet 2 on the upper side and/or the steel sheet 1 on the lower side of the faying interface 7 has the following structure.

As shown in FIG. 1(B), the intersections of fines S parallel to the faying interface 7 (or the line segment X described above) with the boundary of the nugget 3 are defined as points 1, and positions on the lines Z in the HAS 6 are defined as points r. Regions which are located inside the HAS 6, in which the distance M (mm) between each line and the faying interface 7 in the sheet thickness direction satisfies formula (5) below, and in which the distance T (mm) from each of the points g and a corresponding one of the points r satisfies formula (6) below are defined as strong HAZ regions 61. The line segment X (the faying interface 7) and the lines Z are perpendicular to the sheet thickness direction of the steel sheets.

In the example shown in FIGS. 1(A) and 1(B), the upper steel sheet 2 and the lower the steel sheet 1 have their respective strong HAZ regions 61 located outside the edge region 31. Only the upper steel sheet 2 or the lower steel sheet 1 may have the strong HAZ region 61.

The hardness Hh of the strong HAZ regions 61 and the hardness Hmh of the martensite in the steel sheets that is computed using formula (7) below satisfy formula (8) below.

$$M = D/20 \quad (5)$$

$$0 < T \leq D/10 \quad (6)$$

$$Hmh = 884 \times Ch \times (1 - 0.3 \times Ch^2) + 294 \quad (7)$$

$$Hh < Hmh - 25 \quad (8)$$

In formula (7), Ch (% by mass): the content of C in the steel sheet on the upper side of the Laying interface or the content of C in the steel sheet on the lower side of the faying interface.

If the strong HAZ regions 61 do not satisfy formulas (5) and (6) above, the strong HAZ regions 61 are positions (regions) close to the base material in the HAZ 6. The positions close to the base material are unlikely to affect the joint strength. As described above, in the disclosed embodiments, the hardness of the specific regions in the HAZ that affects the joint strength is specified, and this allows the degree of tempering to be controlled appropriately. Therefore, the strong HAZ regions 61 satisfy formulas (5) and (6) above. In formula (5) above, it is more preferable that $M=D/15$. In formula (6), it is preferable that $0<T\leq D/8$.

If the hardness Hh of the strong HAZ regions 61 does not satisfy formula (8) above, i.e., is (Hmh−25) or more, the degree of tempering in the strong HAZ regions 61 may be excessively high, and their temperature may have been once increased to the melting temperature. In this case, the microstructure of the strong HAZ regions 61 becomes martensite, and the toughness decreases, so that the joint strength may decrease. Therefore, from the viewpoint of performing appropriate tempering on the HAZ 6, the hardness Hh of the strong HAZ regions 61 is less than (Hmh−25) and preferably (Hmh−40) or less.

The lower limit of the hardness Hh of the strong HAZ regions 61 is not particularly specified. Since there may be a limit on the reduction in the hardness by tempering, the hardness Hh of the strong HAZ regions 61 is preferably (Hmh−700) or more.

A cap (sheet gap) may be present at the faying interface between the overlapping steel sheets. In this case, the effects of the disclosed embodiments can be obtained when an edge region 31 specified by the following description has the above-described metal microstructure and the above-described hardness Hv and strong HAZ regions 61 have the above described hardness Hh. FIG. 2 shows an example of a weld having a sheet gap G.

In the example shown in FIG. 2, two points on the boundary of a nugget 3 at intersections of the boundary with a straight line equidistant from two straight lines formed from steel sheet surfaces of the steel sheets 1 and 2 that face each other (the straight line is a line Y that is located at the midpoint of the sheet gap G in the sheet thickness direction and parallel to the steel sheet surfaces of the steel sheets 1 and 2) are defined as the first edge 8a and the second edge 8b. The edge region 31 is a region which is located inside the nugget 3 and in which the distance L from the first edge 8a to the point O and the distance L from the second edge 8b to the point P satisfy formula (1), as in the above case. The strong HAZ regions 61 may be defined in the same manner as described above with the straight line Y considered as the "faying interface."

Next, a description will be given of an example of a weld in a sheet set including three steel sheets using FIGS. 3(A) and 3(B).

As described above, in the disclosed embodiments, three or more steels sheets may be stacked. In a welded member formed by resistance spot-welding three of more overlapping steel sheets, two or more faying interfaces 7 are present, and an edge region 31 and strong HAZ regions 61 are present far each of the faying interfaces 1. In this case, the effects of the disclosed embodiments are similarly obtained when the edge region 31 corresponding to at least one of the two or more faying interfaces has the above-described metal microstructure and the above-described hardness Hv and the strong HAZ regions 61 corresponding to at least one of the two or more faying interfaces have the above-described hardness Hh.

In the example shown in FIGS. 3(A) and 3(B), the number of faying interfaces is two. The upper faying interface is defined as a first faying interface 7a, and the lower faying interface is defined as a second faying interface 7b.

Two points on the first faying interface 7a and also on the boundary of the nugget 3 are defined as a first edge $8a_1$ and a second edge $8b_1$, and the length of a line segment $X_1$ connecting the first edge $8a_1$ and the second edge $8b_1$ is defined as $D_1$. The distance between a point $O_1$ on the line segment $X_1$ and the first edge $8a_1$ and the distance between a point $P_1$ on the line segment $X_1$ and the second edge $8b_1$ are defined as $L_1$. A region in the nugget 3 in which the distances $L_1$ satisfy formula (1) above is defined as an edge region 31.

In the steel sheet 2 on the upper side and/or the steel sheet 10 on the lower side of the first faying interface 7a, the intersections of the boundary of the nugget 3 with lines $Z_1$ parallel to the faying interface 7 are defined as points $q_1$, and positions on the lines $Z_1$ within the HAZ 6 are defined as points $r_1$. Regions which are located inside the HAZ 6, in which the distance $M_1$ (mm) between each line $Z_1$ and the first faying interface 7a in the sheet thickness direction satisfies formula (5) above, and in which the distance $T_1$ (mm) between each of the points $q_1$ and a corresponding one of the points $r_1$ satisfies formula (6) above are defined as strong HAZs 61.

Similarly, two points on the second faying interface 7b and also on the boundary of the nugget 3 are defined as a first edge $8a_2$ and a second edge $8b_2$, and the length of a line segment $X_2$ connecting the first edge $8a_2$ and the second edge $8b_2$ is defined as $D_2$. The distance between a point $O_2$ on the line segment $X_2$ and the first edge $8a_2$ and the distance between a point $P_2$ on the line segment $X_2$ and the second edge $8b_2$ are defined as $L_2$. A region in the nugget 3 in which the distances $L_2$ satisfy formula (1) above is defined as an edge region 31.

In the steel sheet 10 on the upper side and/or the steel sheet 1 on the lower side of the second faying interface 7b, the intersections of lines $Z_2$ parallel to the second faying interface 7b with the boundary of the nugget 3 are defined as points $q_2$, and positions on the line $Z_2$ within the HAZ 6 are defined as points $r_2$. Regions in which the distance $M_2$ (mm) be the second faying interface 7b and each line $Z_2$ in the sheet thickness direction satisfies formula (5) above and in which the distance $T_2$ (mm) between each of the points $q_2$ and a corresponding one of the points $r_2$ satisfies formula (6) above are defined as strong HAZs 61.

When an edge region 31 and strong HAZ regions 61 corresponding to one of the first faying interface 7a and the second Laying interface 7b or the edge regions 31 and the strong HAZ regions 61 corresponding to both the first Paying interface 7a and the second Laying interface 7b satisfy the conditions described above, the toughness of the edge position of the nugget is improved, so that the effects of the disclosed embodiments are obtained.

In the disclosed embodiments, the hardness of the nugget edge region and the hardness of the heat-affected zone (HAZ) can be measured using a method described in Examples described later.

Next, the high-strength steel sheet used in the disclosed embodiments will be described. As described above, in the disclosed embodiments, at least one steel sheet of the overlapping steel sheets is the high-strength steel sheet having the chemical composition described below. Specifically, it is only necessary that, in the chemical composition of the high-strength steel sheet, C, Si, Mn, and P satisfy ranges described below. When these ranges are satisfied, a resistance spot welding method according to an embodiment or the disclosed embodiments can be effectively applied. In the following description, "% by mass" is denoted simply as "%" unless otherwise specified.

C: 0.05 to 0.6%

C is an element that contributes to strengthening of the steel if the content of C is less than 0.05%, the strength of the steel is low, and it is very difficult to produce a steel sheet having a tensile strength of 780 MPa or more. If the content of C exceeds 0.6%, although the strength of the steel sheets is high, the amount of hard martensite is excessively large, so that the amount of micro-voids increases. Moreover, the nugget and the heat-affected zone (HAZ) therearound are excessively hardened, and the degree of embrittlement increases, so that it is difficult to improve the cross tension strength (CTS). Therefore, the content of C is 0.05 to 0.6%. The content of C is more preferably 0.1% or more and more preferably 0.3% or less.

Si: 0.1 to 3.5%

When the content of Si is 0.1% or more, Si acts effectively to strengthen the steel. However, if the content of Si exceeds 3.5%, although the steel is strengthened, Si may adversely affect the toughness. Therefore, the content of Si is 0.1 to 3.5%. The content of Si is more preferably 0.2% or more and more preferably 2.0% or less.

Mn: 1.5 to 10.0%

If the content of Mn is less than 1.5%, high joint strength can be obtained even when cooling is not performed for a long time as in the disclosed embodiments. If the content of Mn exceeds 10.0%, embrittlement of the weld or cracking due to embrittlement occurs significantly, so that it is difficult to improve the joint strength. Therefore, the content of Mn is 1.5% or more and 10.0% or less. The content of Mn is more preferably 2.0% or more and more preferably 8.0% or less.

P: 0.1% or less

P is an incidental impurity. If the content of P exceeds 0.1%, strong segregation occurs in the edge portion of the nugget of the weld, so that it is difficult to improve the joint strength. Therefore, the content of P is 0.1% or less. The content of P is more preferably 0.05% or less and still more preferably 0.02% or less.

In the disclosed embodiments, one or two or more selected from Cu, Ni, Mo, Cr, Nb, V, Ti, R, Al, and Ca may be optionally added.

Cu, Ni, and Mo are elements that can contribute to an improvement in the strength of the steel. Cr is an element that can improve hardenability to thereby improve the strength. Nb and V are elements that can control the microstructure through precipitation hardening to thereby strengthen the steel. Ti and B are elements that can improve hardenability to thereby strengthen the steel. Al is an element that can control the microstructure through a reduction in the grain size of austenite. Ca is an element that can contribute to an improvement in the workability of the steel. To obtain these effects, one or two or more elements selected from Cu, Ni, Mo, Cr, Nb, V, Ti, B, Al, and Ca may be optionally added in addition to the above-described chemical composition. If excessively large amounts of these elements are contained, deterioration in toughness or cracking may occur. Therefore, when these elements are added, the total allowable amount of these elements is 5% or less.

Chemical components other than the above components are Fe and incidental impurities.

The tensile strength of the high-strength steel sheet having the above-described chemical composition is preferably 780 MPa or more. In particular, when the tensile strength of the base material is 780 MPa or more as described above, the CTS may decrease. In the disclosed embodiments, even though the high-strength steel sheet has a tensile strength of 780 MPa or more, the metal microstructure of the nugget edge region etc. is tempered martensite that is a tough microstructure, so that brittle facture of the edge portion of the nugget can be prevented. A reduction in the CTS of the weld can thereby be prevented. Even with a high-strength steel sheet having a tensile strength of less than 780 MPa, the above effects are, of course, obtained.

Even when at least one of the overlapping steel sheets is a galvanized steel sheet, the above effects can be obtained. The galvanized steel sheet is a steel sheet having a coated layer composed mainly of zinc. The coated layer composed mainly of zinc is intended to encompass all known zinc coated layers. Examples of the coated layer composed mainly of zinc include hot-dip galvanized layers, electrogalvanized layers, Zn—Al coated layers, and Zn—Ni coated layers.

The overlapping steel sheets may be prepared by stacking a plurality of steel sheets of the same type or by stacking a plurality of steel sheets of different types. A surface-treated steel sheet having a coated layer and a steel sheet having no coated layer may be stacked together. The thicknesses of the steel sheets may be the same or different, and no problem arises in either case. For example, since targets of the resistance spot welding are general steel sheets for automobiles, the thickness of the steel sheets is preferably 0.4 mm to 2.2 mm.

Figure 4:
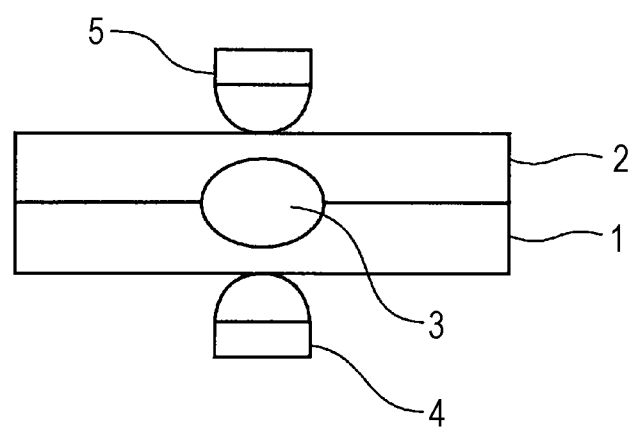
FIG. 4 is a cross-sectional view illustrating a state of resistance spot welding in an embodiment of the disclosed embodiments.

Next, the resistance spot welding method of the disclosed embodiments will be described using FIG. 4. FIG. 4 is a schematic diagram illustrating an example in which two steel sheets are resistance spot-welded.

In the resistance spot welding method of the disclosed embodiments, a steel sheet 1 to be disposed on the lower side and a steel sheet 2 to be disposed on the upper side are first stacked together as shown in FIG. 4. In the disclosed embodiments, at least one of the overlapping steel sheets is a high-strength steel sheet having the above-described chemical composition. In the example shown in FIG. 4, the lower steel sheet 1 and/or the upper steel sheet 2 is the high-strength steel sheet.

The lower steel sheet 1 and the upper steel sheet 2 stacked together are held between a pair of upper and lower electrodes 4 and 5, and the electrodes are energized while pressure is applied to the steel sheets. In the example shown in FIG. 4, the steel sheets 1 and 2 are held between the electrode 4 (lower electrode) disposed on the lower side and the electrode 5 (upper electrode) disposed on the upper side. The energization described above is an energization step described below. A nugget 3 having a necessary size is thereby formed, and a welded member having the resistance spot weld described above is obtained.

The energization step in the disclosed embodiments be described in detail. In the disclosed embodiments, the lower electrode 4 and the upper electrode 5 are used to control the step of energizing the lower steel sheet 1 and the upper steel sheet 2 as follows.

First, a primary energization step for energization at a current value $I_w$ (kA) is performed. Next, a cooling process for cooling for a cooling time $t_c$ (ms) represented by formula (13) below is performed. Then, a tempering step is performed. Specifically, energization is performed at a current value $I_t$ (kA) represented by formula (14) below for an energization time $t_p$ (ms) represented by formula (15) below.

$$400 \leq t_c \quad (13)$$

$$I_t \leq 00.95 \times I_w \quad (14)$$

$$400 \leq t_p \quad (15)$$

[Primary Energization Step]

The primary energization step is an energization step of melting the overlapping portions of the overlapping steel sheets (the lower steel sheet 1 and the upper steel sheet 2 in the example shown in FIG. 4) to form a nugget 3. In the disclosed embodiments, the energization is performed at a current value $I_w$ (kA) to form the weld.

In the disclosed embodiments, no particular limitation is imposed on the energization conditions and the pressurizing condition for forming the nugget 3 in the primary energization step. Conventionally used welding conditions can be used. The energization conditions for the primary energization are preferably such that the energization time $t_w$ is 120 to 400 ms and the current value $I_w$ is 4 to 8 PA. The pressurizing condition is preferably 2.0 to 4.0 kN. The lower limit of the current value is preferably a current value that allows the nugget to have a diameter of $3\sqrt{t}$ (t: sheet thickness) (mm) or more, and the upper limit of the current value is preferably a current value that does not cause expulsion so that a stable nugget diameter is obtained.

[Cooling Process]

A cooling process is provided between the primary energization step and the tempering step described later. In the cooling process, the cooling is performed to a temperature at which the microstructure of the edge region 31 undergoes martensitic transformation. In the disclosed embodiments, the cooling is performed for a cooling time $t_c$ (ms) represented by formula (13) above. If the cooling time $t_c$ is shorter than 400 ms, the edge portion of the nugget cannot be cooled to the temperature at which martensitic transformation occurs. In this case, the retained austenite microstructure in the edge region 31 that has not undergone martensitic transformation forms one or two of the martensite microstructure and the retained austenite microstructure through re-energization and re-cooling in the tempering step described later. These microstructures are not the tempered martensite microstructure having toughness and are hard microstructures. Since these microstructures are not the tempered marten site microstructure and are microstructures with no toughness, the microstructure of the edge region 31 is brittle. Therefore, the cooling time $t_c$ is 400 ms or longer.

To allow the microstructure in the edge region 31 to be transformed to the martensite microstructure more sufficiently and allow the microstructure in the edge region 31 to be transformed to the tempered martensite microstructure in the tempering step described later to thereby improve the joint strength, the cooling time $t_c$ is preferably 600 ms or more. The cooling time $t_c$ is more preferably 800 ms or longer and still more preferably 1000 ms or longer.

The upper limit of the cooling time $t_c$ is not particularly specified. To reduce the operation time in order to improve workability, the cooling time $t_c$ (ms) is preferably 8000 ms or shorter. The cooling time $t_c$ is more preferably 4000 ms or shorter, still more preferably 2000 ms or shorter, and yet more preferably 1000 ms or shorter.

[Tempering Step]

The tempering step is a secondary heat treatment step in which the edge region 31 of the nugget 3 formed in the primary energization step is tempered to improve the toughness. In the disclosed embodiments, the tempering step is performed in a temperature range suitable for tempering the microstructure of the edge region 31 that has been transformed to the martensite microstructure in the cooling process.

To obtain the effects of the disclosed embodiments, it is necessary to perform the tempering such that the martensite microstructure in the edge region 31 of the nugget formed in the steel sheets containing the above-described components in the disclosed embodiments is transformed to the tempered martensite microstructure.

If the temperature in the tempering step is low, the microstructure of the edge portion of the weld nugget is not tempered, and a large amount of the brittle martensite microstructure remains present. If the tempering is performed in the embrittlement range, impurities such as P remain at grain boundaries. Therefore, the edge region 31 has a brittle metal microstructure. The joint strength is thereby low.

As the temperature in the tempering step increases, the martensite microstructure formed by cooling after the primary energization step undergoes reverse transformation, and the ratio of the microstructure transformed back to austenite increases. Therefore, a large amount of the martensite microstructure remains present after completion of the secondary energization (tempering step). In this case, as in the case where the tempering temperature is low, the ratio of the martensite microstructure is large, and therefore the joint strength is low.

Therefore, by tempering the microstructure of the edge region 31 at a temperature higher or lower than the embrittlement range to form a microstructure including tempered martensite as a main phase, the joint strength is improved. It is therefore necessary to control the temperature in the tempering step to as appropriate temperature. Thus, in the disclosed embodiments, it is important to control the welding conditions in the tempering step as follows.

In the tempering step, the energization is performed using the current value $I_t$ (kA) represented by formula (14) above for the energization time $t_p$ (ms) represented by formula (15) above.

If the current value $I_t$ during the energization in the tempering step exceeds $(0.95 \times I_w)$ kA, the microstructure that has undergone the martensitic transformation in the cooling process is again melted or heated to the austenite range because the current value during the energization for tempering is excessively large, and the martensite microstructure is finally formed. In this case, the edge region 31 has the brittle microstructure, and the joint strength is not improved. Therefore, the current value $I_t$ is set to $(0.95 \times I_w)$ kA or less. To prevent re-melting of the edge region 31 in the tempering step and an increase in the temperature to the austenite range, the current value $I_t$ is preferably $(0.9 \times I_w)$ kA or less and more preferably $(0.8 \times I_w)$ kA or less.

The lower limit of the current value $I_t$ is not particularly specified. However, to temper the edge region 31 such that it has the above-described metal microstructure, the current value $I_t$ is preferably $(0.4 \times I_w)$ kA or more, more preferably $(0.5 \times I_w)$ kA or more, and still more preferably $(0.6 \times I_w)$ kA or less.

If the energization time $t_p$ in the tempering step is shorter than 400 ms, the martensite microstructure in the edge region 31 formed in the cooling process cannot be transformed to the tempered martensite microstructure. In this case, the area fraction of the tempered martensite microstructure formed in the tempering step cannot be 60% or more. Moreover, the edge region 31 cannot have the hardness Hv described above.

To allow toe strong HAZ regions 61 to nave the hardness Hh described above, it is necessary that the HAZ be tempered at a temperature equal to or higher than the embrittlement range. However, if the temperature is excessively high, the temperature exceeds the melting point, so that, in the metal microstructure obtained, the amount of the martensite microstructure is large. Therefore, in the tempering step, the temperature must not be increased to a temperature equal to or higher than the temperature appropriate for tempering. Specifically, it is not preferable to increase the current value excessively. The longer the time of the tempering step, the further the tempering is facilitated. However, if the time is excessively long, it is feared that the temperature may be increased to a temperature equal to or higher than the appropriate temperature.

Therefore, the energization time $t_p$ is 400 ms or longer. The energization time $t_p$ is more preferably 600 ms or longer and still more preferably 800 ms or longer. The upper limit of the energization time $t_p$ is not particularly specified. To reduce the operation time in order to improve workability, the energization time $t_p$ is preferably 3000 ms or shorter, more preferably 2000 ms or shorter, still more preferably 1500 ms or shorter, and yet more preferably 1000 ms or shorter.

The average grain size of the carbides generated in the edge region 31 in the tempering step is desirably 300 nm or less. It has been found that, for the above target steel sheets in the disclosed embodiments, the embrittlement temperature range exists for tempering temperature and that the joint strength is not improved when the tempering temperature is in a temperature range higher than the melting point. It is therefore only necessary that the tempering be performed in a temperature range equal to or lower than the melting point and equal to or lower than the embrittlement range or in a temperature range equal to or lower than the melting point and equal to or higher than the embrittlement range. In the disclosed embodiments, the tempered martensite can be obtained in any of these temperature ranges, and the toughness can be maintained, so that the joint strength can be improved.

No particular limitation is imposed on the energization conditions (e.g., the pressure applied, the electrodes, and the holding time) in the tempering step because the energization conditions vary depending on the sheet set of the steel sheets and their thickness, and the number of energization operations is not limited.

In the disclosed embodiments, any welding apparatus that includes a pair of upper and lower electrodes and can apply pressure and energize the pair of electrode holding a portion to be welded therebetween can be preferably used to perform the resistance spot welding method described above. Preferably, the welding apparatus further includes a pressure controller the can freely control the pressure applied during welding and a welding current controller that can freely control the welding current. No particular limitation is imposed on the pressurizing mechanism (such as an air cylinder or a servo motor), the current control mechanism (such as an AC or DC current control mechanism), the type (a stationary type, a robot gun, etc.), etc. No particular limitation is imposed on the type of power source (a single-phase AC type, an AC inverter type, or a DC inverter type). No particular limitation is imposed on the shape of the electrodes. Examples of the type of electrode tip include a DR type (dome radius type), an R type (radius type), and a D type (dome type) specified in JIS C 9304: 1999.

Next, the resistance spot welded joint of the disclosed embodiments will be described.

The disclosed embodiments provide the resistance spot welded joint including the resistance spot weld described above. The resistance spot welded joint of the disclosed embodiments is, for example, a joint obtained by joining two or more overlapping steel sheets together via the resistance spot weld including the fusion zone and the HAZ having the above-described metal microstructure and hardness. The steel sheets, the welding conditions, the metal microstructure of the weld, etc. are the same as those described above, and therefore the description thereof will be omitted.

Next, the resistance spot welded joint manufacturing method of the disclosed embodiments be described.

The disclosed embodiments provide the method for manufacturing a resistance spot welded joint using the resistance spot welding method described above. In the resistance spot welded joint manufacturing method of the disclosed embodiments, for example, a sheet set including two or more overlapping steel sheets is held between a pair of electrodes, and resistance spot welding in which the electrodes are energized under the welding conditions described above while pressure is applied to the sheet set is performed to form a nugget with a necessary size, whereby a resistance spot welded joint is obtained. The steel sheets, the welding conditions, the metal microstructure of the weld, etc. are the same as those described above, and therefore the description thereof will be omitted.

As described above, in the disclosed embodiments, the temperature of the joint portion is controlled in the tempering step so as to fall within the appropriate temperature range to thereby temper the edge portion of the nugget. In this manner, the edge region 31 has the above-described metal microstructure and the above-described hardness Hv, and the strong HAZ regions have the above-described hardness Hh. Moreover, since the hardness Hh of the strong HAZ regions 61 is controlled to the prescribed range, the possibility that the edge portion of the nugget and the HAZ have once been subjected to the embrittlement temperature range can be judged. The toughness of the weld can thereby be improved, and the CTS can be improved. Specifically, both the TSS and the CTS can be achieved.

By manufacturing a welded joint having the weld of the disclosed embodiments, the joint strength of the welded Joint obtained can be improved. Therefore, even when the sheet set includes a medium Mn steel sheet (high-strength steel sheet) containing the above-described steel sheet components, the effect of improving the joint strength (particularly the CTS) can be obtained.

In the disclosed embodiments, when a measured CTS value of a joint is JIS class A (3.4 kN) or higher in the criteria for CTS described later in Examples, the joint is rated good (has excellent joint strength).

Examples

The operations and effects of the disclosed embodiments will be described by way of Examples. However, the disclosed embodiments is not limited to the following Examples.

In the Examples, a servo motor pressurizing-type resistance welding device attached to a C gun and including a DC power source was used to perform resistance spot welding on a sheet set including two overlapping steel sheets (a lower steel sheet 1 and an upper steel sheet 2) to form a nugget 3 having a necessary size, and a resistance spot welded joint was thereby produced.

780 MPa grade to 1180 MPa grade high-strength steel sheets (steel sheets A to H) having thicknesses of 0.8 mm and 1.2 mm were used as test specimens. The size of each test specimen was long sides: 150 mm and short sides: 50 mm. The steel sheets A to H used have the following chemical compositions. In the following description, "%" in the chemical compositions of the steel sheets means "% by mass" unless otherwise specified.

[Chemical Composition of Steel Sheet A]

A steel sheet containing C: 0.20%, Si: 0.6%, Mn: 4.0%, and P: 0.01%, with the balance being Fe and incidental impurities.

[Chemical Composition of Steel Sheet B]

A steel sheet containing C: 0.10%, Si: 0.2%, Mn: 6.0%, and P 0.01%, with the balance being Fe and incidental impurities.

[Chemical Composition of Steel Sheet C]

A steel sheet containing C: 0.10%, Si: 1.1%, Mn: 1.2%, P 0.01%, Ti: 0.03%, B: 0.002%, and Cr: 0.40%, with the balance being Fe and incidental impurities.

[Chemical Composition of Steel Sheet D]

A steel sheet containing C: 0.13%, Si: 0.8%, Mn: 1.2%, P: 0.01%, Cu: 0.50%, Ni: 0.51%, Mo: 0.19%, and Al: 0.03%, with the balance being Fe and incidental impurities.

[Chemical Composition of Steel Sheet E]

A steel sheet containing C: 0.58%, Si: 0.25%, Mn: 0.75%, and P: 0.03%, with the balance being Fe and incidental impurities.

[Chemical Composition of Steel Sheet F]

A steel sheet containing C: 0.30%, Si: 3.5%, Mn: 2.5%, P: 0.01%, Nb: 0.04%, V: 0.03%, and Ca: 0.004%, with the balance being Fe and incidental impurities.

[Chemical Composition of Steel Sheet G]

A steel sheet containing C: 0.60%, Si: 2.0%, Mn: 1.5%, and P: 0.01%, with the balance being Fe and incidental impurities.

[Chemical Composition of Steel Sheet H]

A steel sheet containing C: 0.20%, Si: 0.3%, Mn: 1.5%, and P: 0.01%, with the balance being Fe and incidental impurities.

Two or more steel sheets were selected from the steel sheets A to H as shown in Table 1 and stacked to obtain a sheet set. In the sheet sets a to h and the sheet set j, the thicknesses of the sheets were the same and were 1.2 mm. In the sheet set i, three medium Mn steel sheets A of the same type were stacked, and the thicknesses of the sheets were 0.8 mm.

Next, each sheet set was used and subjected to resistance spot welding under welding conditions shown in Table 2 to form a nugget 3 with a necessary size, and a resistance spot welded joint was thereby obtained. In this case, the energization was performed under the following conditions. The pressure applied during the energization was maintained constant at 3.5 kN. The lower electrode 4 and the upper electrode 5 used were each a DR-type chromium-copper electrode having a tip diameter of 6 mm and a tip radius of curvature of 40 mm. The nugget was formed such that its diameter was $5.5\sqrt{t}$ (mm) or less, where t is the sheet thickness (mm).

The resistance spot welded joint obtained was used to evaluate the microstructure and hardness of the edge portion of the nugget, the hardness of the heat-affected zone (HAZ), and the CTS according to methods described below.

[Microstructure and Hardness of Nugget]

A sample used for the observation of the microstructure of the edge portion of the nugget (nugget edge region) was obtained as follows. One of the resistance spot welded joints was cut to obtain a test specimen, and the test specimen was subjected to ultrasonic cleaning and embedded in a resin. The cross section of the test specimen was polished and etched with a nital solution to thereby obtain the sample. An SEM was used to observe the microstructure, and the observation was performed at 1000× to 100000×. The hardness was measured using a Vickers hardness meter according to a method specified in JIS Z 2244. The microstructure of the nugget edge region in the resistance spot welded joint, the hardness of the nugget edge region, the hardness of the nugget as a whole, and the hardness of the heat-affected zone are shown in Tables 3-1 and 3-2.

The points of measurement of the hardness of the "nugget edge region" shown an Tables 3-1 and 3-2 are a position spaced 0.02 mm from the second edge 8b toward the center of the nugget and a position spaced 0.02 mm from the point P toward the HAZ 6 on the line segment X connecting two points (the first edge 8a and the second edge 8b) at which the boundary of the nugget 3 having an elliptical cross section that is taken in the sheet thickness direction intersects the faying interface 7 between the steel sheets, as shown in FIG. 1(A). An indentation was formed at each of the two points, and their values were measured.

Carbides in the tempered martensite microstructure in the nugget edge region were measured as follows. To observe a cross section of the weld, a cross-section sample was slightly etched with vital, and an image was taken at 30000× using an SEM (Scanning Electron Microscope). The size of the carbides in the SEM photograph was measured using image processing software. The fraction (area fraction) of the carbides was computed using image binarization software. As described above, carbide particles having an average grain size of 300 nm or less were used as targets for the computation of the fraction (area fraction) of the carbides.

[Hardness of Heat-Affected Zone]

The hardness of the heat-affected zone, i.e., the strong HAZ regions described above, was measured. As for the measurement of the hardness of "the strong HAZ regions 61," a sample was produced in the same manner as in the observation of the microstructure of the edge portion of the nugget (the nugget edge region), and then the measurement was performed. The hardness of "the strong HAZ regions 61" was measured using a Vickers hardness meter according to a method specified in JIS Z 2244.

The points of measurement of the hardness of "the strong HAZ regions 61" shown in Tables 3-1 and 3-2 were set as shown in FIG. 1(A). In the upper steel sheet in each of the Examples, intersections of a line Z spaced a distance M (mm)=D/20 from the faying interface 7 in the sheet thickness direction with the boundary of the nugget 3 are defined as points q, and positions on the line Z within the HAZ are defined as points r. A region in the HAZ in which the distance T from each point q to a corresponding point r satisfies T (mm)=D/10 is defined as a strong HAZ region. An indentation was formed at a position spaced 0.3 mm from a point q toward the HAZ 6, and its value was measured. In the lower steel sheet also, a strong HAZ region is defined in the same manner as above. An indentation was formed at a position spaced 0.3 mm from a point q toward the HAZ 6, and its value was measured.

[Evaluation of CTS]

To evaluate the CTS, each of the produced resistance spot welded joints was subjected to a cross tensile test according to a method specified in JIS Z 3137 to measure the CTS (cross tension strength). The criteria for the CTS are as follows. When the measured value was JIS class A (3.4 kN) or higher, the symbol ○ was assigned. When the measured value was lower than JIS class A, the symbol x was assigned. In the Examples, the evaluation symbol ○ means good (the joint strength is good), and the evaluation symbol x means poor. Table 4 shows the results of evaluation of the CTS of the resistance spot welded joints after welding.

TABLE 1

| Sheet set | Stacking position of sheet | Type of steel sheet | Tensile strength | Thickness of steel sheet |
|---|---|---|---|---|
| a | First sheet | Medium Mn steel sheet A | 1180 MPa | 1.2 mm |
|   | Second sheet | Medium Mn steel sheet A | 1180 MPa | 1.2 mm |
| b | First sheet | Medium Mn steel sheet B | 1180 MPa | 1.2 mm |
|   | Second sheet | Medium Mn steel sheet B | 1180 MPa | 1.2 mm |
| c | First sheet | Medium Mn steel sheet A | 1180 MPa | 1.2 mm |
|   | Second sheet | Medium Mn steel sheet B | 1180 MPa | 1.2 mm |
| d | First sheet | Medium Mn steel sheet A | 1180 MPa | 1.2 mm |
|   | Second sheet | Steel sheet C | 980 MPa | 1.2 mm |
| e | First sheet | Medium Mn steel sheet A | 1180 MPa | 1.2 mm |
|   | Second sheet | Steel sheet D | 780 MPa | 1.2 mm |
| f | First sheet | High C steel sheet E | 1180 MPa | 1.2 mm |
|   | Second sheet | High C steel sheet E | 1180 MPa | 1.2 mm |
| g | First sheet | Medium Mn steel sheet F | 1180 MPa | 1.2 mm |
|   | Second sheet | Medium Mn steel sheet F | 1180 MPa | 1.2 mm |
| h | First sheet | Medium Mn steel sheet G | 1180 MPa | 1.2 mm |
|   | Second sheet | Medium Mn steel sheet G | 1180 MPa | 1.2 mm |
| i | First sheet | Medium Mn steel sheet A | 1180 MPa | 0.8 mm |
|   | Second sheet | Medium Mn steel sheet A | 1180 MPa | 0.8 mm |
|   | Third sheet | Medium Mn steel sheet A | 1180 MPa | 0.8 mm |
| j | First sheet | Medium Mn steel sheet H | 780 MPa | 1.2 mm |
|   | Second sheet | Medium Mn steel sheet H | 780 MPa | 1.2 mm |

TABLE 2

| Welding No. | Sheet set | Presence of sheet gap | Primary energization step Current value $I_w$ (kA) | Primary energization step Energization time $t_w$ (ms) | Cooling process Cooling time $t_c$ (ms) | Tempering step Current value $I_t$ (kA) | Tempering step Energization time $t_p$ (ms) |
|---|---|---|---|---|---|---|---|
| 1 | a | No | 6.5 | 280 | — | — | — |
| 2 | a | No | 6.0 | 400 | — | — | — |
| 3 | a | No | 6.5 | 280 | 1500 | 5.2 | 1000 |
| 4 | a | No | 6.5 | 280 | 2000 | 5.3 | 1200 |
| 5 | a | No | 6.5 | 280 | 1500 | 7.0 | 1000 |
| 6 | a | No | 6.5 | 280 | 1000 | 5.5 | 2000 |
| 7 | a | Yes | 6.5 | 280 | 2000 | 6.0 | 1000 |
| 8 | a | No | 6.5 | 280 | 1000 | 6.4 | 2000 |
| 9 | a | No | 6.5 | 280 | 1000 | 4.0 | 1000 |
| 10 | a | No | 6.5 | 280 | 2000 | 4.0 | 3000 |
| 11 | a | No | 6.5 | 280 | 1500 | 5.0 | 1000 |
| 12 | a | No | 6.5 | 280 | 1200 | 5.9 | 1500 |
| 13 | a | No | 6.5 | 280 | 1600 | 4.8 | 600 |
| 14 | b | No | 6.5 | 280 | 3000 | 6.0 | 2000 |
| 15 | b | No | 6.0 | 320 | 2000 | 5.6 | 1000 |
| 16 | b | No | 6.5 | 280 | 1000 | 7.0 | 1000 |
| 17 | b | No | 6.5 | 280 | 8000 | 6.1 | 2000 |
| 18 | b | No | 6.5 | 280 | 2000 | 5.0 | 1000 |
| 19 | c | No | 6.5 | 280 | 2000 | 5.5 | 1000 |
| 20 | c | No | 6.5 | 280 | 1500 | 6.3 | 1500 |
| 21 | c | No | 6.5 | 280 | 2000 | 4.2 | 500 |
| 22 | c | Yes | 6.8 | 280 | 2000 | 4.0 | 500 |
| 23 | c | No | 6.8 | 280 | 4000 | 3.5 | 1500 |
| 24 | d | No | 6.5 | 280 | 1000 | 5.0 | 1000 |
| 25 | d | Yes | 6.5 | 280 | 1500 | 5.9 | 1000 |
| 26 | e | No | 6.5 | 280 | 1000 | 5.2 | 1000 |
| 27 | f | No | 6.5 | 280 | 1000 | 6.3 | 1000 |
| 28 | g | No | 6.5 | 280 | 2000 | 5.3 | 1000 |
| 29 | h | No | 6.5 | 280 | 4000 | 5.4 | 1500 |
| 30 | i | No | 6.5 | 280 | 1500 | 5.2 | 1000 |
| 31 | i | No | 6.5 | 280 | 4000 | 5.8 | 1000 |
| 32 | b | No | 6.5 | 280 | 1200 | 6 | 320 |
| 33 | j | No | 6.5 | 280 | 800 | 5.1 | 450 |
| 34 | j | No | 6.5 | 280 | 600 | 5.5 | 400 |

TABLE 3-1

| | | Edge region of nugget [*1] | | | | | Hardness of nugget | | | | |
|---|---|---|---|---|---|---|---|---|---|---|---|
| | | | | | | | | Hardness of edge region of nugget Hv | | | |
| | | | | | | | | First faying interface | | Second faying interface | |
| Welding No. | Metal micro-structure | Area fraction of TM (%) | Area fraction of micro-structures other than TM (%) | Length of line segment X (mm) | Distance L from first edge to point O (mm) | Distance L from second edge to point P (mm) | Hardness of M in nugget as a whole Hmw | Position spaced 0.02 mm from second edge toward center of nugget | Position spaced 0.02 mm from point P toward HAZ | Position spaced 0.02 mm from second edge toward center of nugget | Position spaced 0.02 mm from point P toward HAZ |
| 1 | M | 0 | 100 | 5.5 | 1.3 | 1.3 | 468 | 520 | 515 | — | — |
| 2 | M | 0 | 100 | 4.8 | 1.2 | 1.2 | 468 | 510 | 512 | — | — |
| 3 | TM | 100 | 0 | 5.5 | 1.3 | 1.3 | 468 | 330 | 356 | — | — |
| 4 | TM | 100 | 0 | 5.5 | 1.3 | 1.3 | 468 | 361 | 376 | — | — |
| 5 | M | 0 | 100 | 5.5 | 1.3 | 1.3 | 468 | 518 | 514 | — | — |
| 6 | TM, M | 82 | 18 | 5.5 | 1.3 | 1.3 | 468 | 416 | 412 | — | — |
| 7 | TM | 100 | 0 | 5.5 | 1.3 | 1.3 | 468 | 410 | 407 | — | — |
| 8 | M | 0 | 100 | 5.5 | 1.3 | 1.3 | 468 | 508 | 506 | — | — |
| 9 | TM | 95 | 5 | 5.5 | 1.3 | 1.3 | 468 | 405 | 408 | — | — |
| 10 | TM | 90 | 10 | 5.5 | 1.3 | 1.3 | 468 | 362 | 358 | — | — |
| 11 | TM | 92 | 8 | 5.5 | 1.3 | 1.3 | 468 | 410 | 415 | — | — |
| 12 | TM | 93 | 7 | 5.5 | 1.3 | 1.3 | 468 | 416 | 420 | — | — |
| 13 | TM | 92 | 8 | 5.5 | 1.3 | 1.3 | 468 | 390 | 395 | — | — |
| 14 | TM | 100 | 0 | 5.5 | 1.3 | 1.3 | 382 | 330 | 328 | — | — |
| 15 | TM | 100 | 0 | 5 | 1.2 | 1.2 | 382 | 315 | 320 | — | — |
| 16 | M | 0 | 100 | 5.5 | 1.3 | 1.3 | 382 | 412 | 408 | — | — |
| 17 | TM | 100 | 0 | 5.5 | 1.3 | 1.3 | 382 | 302 | 309 | — | — |
| 18 | TM | 88 | 12 | 5.5 | 1.3 | 1.3 | 382 | 321 | 315 | — | — |
| 19 | TM | 100 | 0 | 5.5 | 1.3 | 1.3 | 425 | 315 | 313 | — | — |
| 20 | TM, M | 50 | 50 | 5.5 | 1.3 | 1.3 | 425 | 402 | 400 | — | — |

| | Ratio of carbides in TM in edge region of nugget (area %) | Hardness of heat affected zone | | | | | | | | |
|---|---|---|---|---|---|---|---|---|---|---|
| | | First faying interface | | | | Second faying interface | | | | |
| | | Upper steel sheet | | Lower steel sheet | | Upper steel sheet | | Lower steel sheet | | |
| Welding No. | | Hardness of strong HAZ region Hh | Hardness of M in steel sheet Hmh | Hardness of strong HAZ region Hh | Hardness of M in steel sheet Hmh | Hardness of strong HAZ region Hh | Hardness of M in steel sheet Hmh | Hardness of strong HAZ region Hh | Hardness of M in steel sheet Hmh | Remarks |
| 1 | 0 | 510 | 468 | 513 | 468 | — | — | — | — | Comparative Example |
| 2 | 0 | 508 | 468 | 510 | 468 | — | — | — | — | Comparative Example |
| 3 | 72 | 346 | 468 | 364 | 468 | — | — | — | — | Example |
| 4 | 85 | 380 | 468 | 375 | 468 | — | — | — | — | Example |
| 5 | 0 | 512 | 468 | 510 | 468 | — | — | — | — | Comparative Example |
| 6 | 45 | 420 | 468 | 423 | 468 | — | — | — | — | Example |
| 7 | 55 | 410 | 468 | 412 | 468 | — | — | — | — | Example |
| 8 | 1 | 489 | 468 | 492 | 468 | — | — | — | — | Comparative Example |
| 9 | 35 | 439 | 468 | 440 | 468 | — | — | — | — | Example |
| 10 | 40 | 410 | 468 | 408 | 468 | — | — | — | — | Example |
| 11 | 23 | 421 | 468 | 425 | 468 | — | — | — | — | Example |
| 12 | 21 | 435 | 468 | 436 | 468 | — | — | — | — | Example |
| 13 | 46 | 416 | 468 | 420 | 468 | — | — | — | — | Example |
| 14 | 45 | 341 | 382 | 331 | 382 | — | — | — | — | Example |
| 15 | 65 | 319 | 382 | 325 | 382 | — | — | — | — | Example |
| 16 | 0 | 408 | 382 | 412 | 382 | — | — | — | — | Comparative Example |
| 17 | 82 | 311 | 382 | 315 | 382 | — | — | — | — | Example |
| 18 | 51 | 341 | 382 | 339 | 382 | — | — | — | — | Example |
| 19 | 75 | 430 | 468 | 320 | 382 | — | — | — | — | Example |
| 20 | 2 | 452 | 468 | 371 | 382 | — | — | — | — | Comparative Example |

*1: Microstructures: TM stands for a tempered martensite microstructure, and M stands for a martensite microstructure.

TABLE 3-2

| | | Edge region of nugget [*1] | | | | | Hardness of nugget | | | | |
|---|---|---|---|---|---|---|---|---|---|---|---|
| | | | | | | | Hardness of edge region of nugget Hv | | | | |
| | | | | | | | First faying interface | | Second faying interface | | |
| Welding No. | Metal micro-structure | Area fraction of TM (%) | Area fraction of micro-structures other than TM (%) | Length of line segment X (mm) | Distance L from first edge to point O (mm) | Distance L from second edge to point P (mm) | Hardness of M in nugget as a whole Hmw | Position spaced 0.02 mm from second edge toward center of nugget | Position spaced 0.02 mm from point P toward HAZ | Position spaced 0.02 mm from second edge toward center of nugget | Position spaced 0.02 mm from point P toward HAZ |
| 21 | TM | 88 | 12 | 5.5 | 1.3 | 1.3 | 425 | 326 | 331 | — | — |
| 22 | TM | 89 | 11 | 5.5 | 1.3 | 1.3 | 425 | 342 | 338 | — | — |
| 23 | TM | 86 | 14 | 5.5 | 1.3 | 1.3 | 425 | 355 | 362 | — | — |
| 24 | TM, M | 90 | 10 | 5.5 | 1.3 | 1.3 | 425 | 365 | 360 | — | — |
| 25 | TM, M | 62 | 38 | 5.5 | 1.3 | 1.3 | 425 | 368 | 370 | — | — |
| 26 | TM, M | 90 | 10 | 5.5 | 1.3 | 1.3 | 438 | 380 | 378 | — | — |
| 27 | TM, M | 10 | 90 | 5.5 | 1.3 | 1.3 | 755 | 721 | 718 | — | — |
| 28 | TM | 100 | 0 | 5.5 | 1.3 | 1.3 | 552 | 465 | 460 | — | — |
| 29 | TM | 100 | 0 | 5.5 | 1.3 | 1.3 | 767 | 398 | 405 | — | — |
| 30 | TM | 100 | 0 | 5.5 | 1.3 | 1.3 | 468 | 400 | 401 | 405 | 398 |
| 31 | TM | 100 | 0 | 5.5 | 1.3 | 1.3 | 468 | 410 | 408 | 406 | 411 |
| 32 | M | 0 | 100 | 5.5 | 1.3 | 1.3 | 382 | 415 | 401 | — | — |
| 33 | TM, M | 71 | 29 | 5.5 | 1.3 | 1.3 | 408 | 341 | 338 | — | — |
| 34 | TM, M | 66 | 34 | 5.5 | 1.3 | 1.3 | 408 | 350 | 352 | — | — |

| | Ratio of carbides in TM in edge region of nugget (area %) | Hardness of heat affected zone | | | | | | | | |
|---|---|---|---|---|---|---|---|---|---|---|
| | | First faying interface | | | | Second faying interface | | | | |
| | | Upper steel sheet | | Lower steel sheet | | Upper steel sheet | | Lower steel sheet | | |
| Welding No. | | Hardness of strong HAZ region Hh | Hardness of M in steel sheet Hmh | Hardness of strong HAZ region Hh | Hardness of M in steel sheet Hmh | Hardness of strong HAZ region Hh | Hardness of M in steel sheet Hmh | Hardness of strong HAZ region Hh | Hardness of M in steel sheet Hmh | Remarks |
| 21 | 49 | 409 | 468 | 321 | 382 | — | — | — | — | Example |
| 22 | 51 | 411 | 468 | 321 | 382 | — | — | — | — | Example |
| 23 | 55 | 391 | 468 | 307 | 382 | — | — | — | — | Example |
| 24 | 60 | 392 | 468 | 332 | 382 | — | — | — | — | Example |
| 25 | 42 | 412 | 468 | 345 | 382 | — | — | — | — | Example |
| 26 | 55 | 400 | 468 | 710 | 408 | — | — | — | — | Example |
| 27 | 1 | 760 | 754 | 776 | 755 | — | — | — | — | Comparative Example |
| 28 | 75 | 451 | 552 | 463 | 552 | — | — | — | — | Example |
| 29 | 80 | 551 | 767 | 545 | 767 | — | — | — | — | Example |
| 30 | 75 | 405 | 468 | 411 | 468 | 409 | 468 | 405 | 468 | Example |
| 31 | 65 | 408 | 468 | 411 | 468 | 416 | 468 | 412 | 468 | Example |
| 32 | 0 | 407 | 382 | 412 | 382 | — | — | — | — | Comparative Example |
| 33 | 42 | 361 | 408 | 369 | 408 | — | — | — | — | Example |
| 34 | 46 | 373 | 408 | 371 | 408 | — | — | — | — | Example |

*1: Microstructures: TM stands for a tempered martensite microstructure, and M stands for a martensite microstructure.

TABLE 4

| Welding No. | CTS (kN) | CTS evaluation | Remarks |
|---|---|---|---|
| 1 | 2.4 | x | Comparative Example |
| 2 | 2.2 | x | Comparative Example |
| 3 | 5.7 | ○ | Example |
| 4 | 5.9 | ○ | Example |
| 5 | 2.4 | x | Comparative Example |
| 6 | 5.5 | ○ | Example |
| 7 | 6.2 | ○ | Example |
| 8 | 2.5 | x | Comparative Example |
| 9 | 5.1 | ○ | Example |
| 10 | 7.0 | ○ | Example |
| 11 | 6.9 | ○ | Example |
| 12 | 4.9 | ○ | Example |
| 13 | 5.0 | ○ | Example |
| 14 | 4.8 | ○ | Example |
| 15 | 4.4 | ○ | Example |
| 16 | 2.8 | x | Comparative Example |
| 17 | 5.5 | ○ | Example |
| 18 | 3.9 | ○ | Example |

TABLE 4-continued

| Welding No. | CTS (kN) | CTS evaluation | Remarks |
|---|---|---|---|
| 19 | 5.4 | ○ | Example |
| 20 | 3.0 | x | Comparative Example |
| 21 | 5.0 | ○ | Example |
| 22 | 4.9 | ○ | Example |
| 23 | 5.5 | ○ | Example |
| 24 | 6.8 | ○ | Example |
| 25 | 5.1 | ○ | Example |
| 26 | 6.6 | ○ | Example |
| 27 | 2.5 | x | Comparative Example |
| 28 | 5.9 | ○ | Example |
| 29 | 3.6 | ○ | Example |
| 30 | 5.1 | ○ | Example |
| 31 | 5.6 | ○ | Example |
| 32 | 2.6 | x | Comparative Example |
| 33 | 5.4 | ○ | Example |
| 34 | 5.2 | ○ | Example |

As shown in Table 4, in Examples in which the resistance spot welding was performed according to the method of the disclosed embodiments, even when high-strength steel sheets having a tensile strength of 780 MPa or more, particularly medium Mn steel sheets, were used, good resistance spot welded joints in which the edge portion of the nugget in the resistance spot weld had toughness were obtained. However, as can be seen, in Comparative Examples in which the welding conditions were different from those in the method of the disclosed embodiments, good joints were not obtained.

REFERENCE SIGNS LIST 1 steel sheet
2 steel sheet
3 nugget
31 nugget edge region
4 lower electrode
5 upper electrode
6 heat-affected zone (HAZ)
61 strong HAZ region
7 faying interface
8a first edge
8b second edge
10 steel sheet

The invention claimed is:

1. A resistance spot weld in a welded member prepared by resistance spot-welding at least two overlapping steel sheets, the resistance spot weld comprising a nugget that comprises a nugget edge region,
wherein
at least one of the steel sheets is a high-strength steel sheet having a chemical composition comprising, in mass %:
C: 0.05 to 0.6%,
Si: 0.1 to 3.5%,
Mn: 1.5 to 10.0%, and
P: 0.1% or less,
two points on a boundary of the nugget at intersections of the boundary of the nugget with a faying interface between the steel sheets are defined as a first edge and a second edge or when a gap is present at the faying interface between the steel sheets, two points on the boundary of the nugget at intersections of the boundary of the nugget with a straight line Y positioned at a midpoint of the gap and parallel to surfaces of the steel sheets are defined as the first edge and the second edge,
a length of a line segment X connecting the first edge and the second edge is defined as D (mm),
on the line segment X:
a point O is positioned between the first edge and a center of the nugget, and
a point P is positioned between the second edge and the center of the nugget,
the nugget edge region is a region which is located inside the nugget and in which a distance L (mm) from the first edge to the point O and the distance L (mm) from the second edge to the point P satisfy formula (1) below:

$$0 < L \leq 0.25 \times D \qquad (1)$$

in at least one of the nugget edge region corresponding to the faying interface:
the nugget edge region has a metal microstructure including tempered martensite as a main phase, and
a hardness Hv of the nugget edge region and a hardness Hmw of martensite in the nugget as a whole satisfy formula (4) below, the hardness Hmw is computed using formulas (2) and (3) below:

$$Hmw = 884 \times Cw \times (1 - 0.3 \times Cw^2) + 294 \qquad (2)$$

$$Cw(\% \text{ by mass}) = \frac{\sum_{i=n} C_i V_i}{\sum_{i=n} V_i} \qquad (3)$$

$$Hv \leq Hmw - 40 \qquad (4)$$

where in formulae (2) and (3):
Cw (% by mass): a content of C per unit volume in the nugget,
$C_i$ (% by mass): a content of C in each of the overlapping steel sheets,
$V_i$ (mm$^2$): a molten area of each of the steel sheets in a region surrounded by the boundary of the nugget and the line segment X in a cross section taken in a sheet thickness direction and passing through a center of the nugget, and
n: a number of overlapping steel sheets,
in the steel sheet that is on an upper side of the faying interface and/or the steel sheet that is on a lower side of the faying interface:
points q are intersections of a straight line Z, which is parallel to the faying interface, with the boundary of the nugget,
points r are positions on the straight line Z in a heat-affected zone,
a region which is located inside the heat-affected zone, in which a distance M (mm) between the straight line Z and the faying interface in the sheet thickness direction satisfies formula (5) below, and in which a distance T (mm) from each of the points q to a corresponding one of the points r satisfies formula (6) below is defined as a strong HAZ region:

$$M = D/20 \qquad (5)$$

$$0 < T \leq D/10 \qquad (6)$$

in at least one of the strong HAZ region corresponding to the faying interface:
a hardness Hh of the strong HAZ region and a hardness Hmh of martensite in the steel sheets satisfy formula (8) below, and the hardness Hmh is computed using formula (7) below:

$$Hmh = 884 \times Ch \times (1 - 0.3 \times Ch^2) + 294 \quad (7)$$

where in formula (7), Ch (% by mass): a content of C in the steel sheet on the upper side of the faying interface or the content of C in the steel sheet on the lower side of the faying interface, and $$Hh < Hmh - 25 \quad (8).$$

2. The resistance spot weld according to claim 1, wherein an area fraction of carbides in the tempered martensite is more than 20%.

3. The resistance spot weld according to claim 2, wherein an average grain size of the carbides is 300 nm or less.

4. The resistance spot weld according to claim 1, wherein the high-strength steel sheet has a tensile strength of 780 MPa or more.

5. A resistance spot welding method for producing the resistance spot weld according to claim 1, the method comprising:
forming a weld by performing a primary energization at a current value $I_w$ (kA) on the at least two overlapping steel sheets;
then cooling the weld for a cooling time $t_c$ (ms) represented by formula (13) below:

$$400 \le t_c, \quad (13); \text{ and}$$

then tempering the weld by performing energization at a current value $I_t$ (kA) represented by formula (14) below for an energization time $t_p$ (ms) represented by formula (15) below:

$$I_t \le 0.95 \times I_w \quad (14), \text{ and}$$

$$400 \le t_p \quad (15).$$

6. A resistance spot welded joint comprising the resistance spot weld according to claim 1.

7. A resistance spot welded joint manufacturing method for manufacturing a resistance spot welded joint, the method comprising performing the resistance spot welding method according to claim 5.

8. The resistance spot weld according to claim 2, wherein the high-strength steel sheet has a tensile strength of 780 MPa or more.

9. The resistance spot weld according to claim 3, wherein the high-strength steel sheet has a tensile strength of 780 MPa or more.

10. The resistance spot welding method according to claim 5, wherein an area fraction of carbides in the tempered martensite is more than 20%.

11. The resistance spot welding method according to claim 10, wherein an average grain size of the carbides is 300 nm or less.

12. The resistance spot welding method according to claim 5, wherein the high-strength steel sheet has a tensile strength of 780 MPa or more.

13. The resistance spot welded joint according to claim 6, wherein an area fraction of carbides in the tempered martensite is more than 20%.

14. The resistance spot welded joint according to claim 13, wherein an average grain size of the carbides is 300 nm or less.

15. The resistance spot welded joint according to claim 6, wherein the high-strength steel sheet has a tensile strength of 780 MPa or more.

16. The resistance spot welded joint according to claim 13, wherein the high-strength steel sheet has a tensile strength of 780 MPa or more.

17. The resistance spot welded joint according to claim 14, wherein the high-strength steel sheet has a tensile strength of 780 MPa or more.

18. The resistance spot welded joint manufacturing method according to claim 7, wherein an area fraction of carbides in the tempered martensite is more than 20%.

19. The resistance spot welding method according to claim 18, wherein an average grain size of the carbides is 300 nm or less.

20. The resistance spot welding method according to claim 7, wherein the high-strength steel sheet has a tensile strength of 780 MPa or more.

* * * * *